(12) United States Patent
Neidhardt et al.

(10) Patent No.: US 11,378,678 B2
(45) Date of Patent: Jul. 5, 2022

(54) METHOD AS WELL AS SYSTEM FOR DETERMINING THE THREE-DIMENSIONAL ALIGNMENT OF COMPONENTS OF A RADAR SYSTEM

(71) Applicant: Rohde & Schwarz GmbH & Co. KG, Munich (DE)

(72) Inventors: Steffen Neidhardt, Munich (DE); Frank Gumbmann, Munich (DE); Sherif Sayed Ahmed, Munich (DE); Benedikt Simper, Munich (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 345 days.

(21) Appl. No.: 16/533,527

(22) Filed: Aug. 6, 2019

(65) Prior Publication Data

US 2020/0049814 A1 Feb. 13, 2020

Related U.S. Application Data

(60) Provisional application No. 62/763,131, filed on Aug. 7, 2018.

(51) Int. Cl.
| | | |
|---|---|---|
| *G01S 13/89* | (2006.01) | |
| *G01S 13/36* | (2006.01) | |
| *H01Q 1/42* | (2006.01) | |
| *G01S 7/40* | (2006.01) | |
| *G01S 7/35* | (2006.01) | |

(52) U.S. Cl.
CPC .............. *G01S 13/89* (2013.01); *G01S 7/352* (2013.01); *G01S 7/4004* (2013.01); *G01S 13/36* (2013.01); *H01Q 1/42* (2013.01)

(58) Field of Classification Search
CPC ........ G01S 13/89; G01S 7/352; G01S 7/4004; G01S 13/36; H01Q 1/42
See application file for complete search history.

(56) References Cited

U.S. PATENT DOCUMENTS

| | | | |
|---|---|---|---|
| 2011/0102234 A1* | 5/2011 | Adams ................... | G01S 13/888 342/22 |
| 2013/0239425 A1* | 9/2013 | Ham ..................... | B60R 19/483 33/533 |
| 2016/0043465 A1* | 2/2016 | McDevitt ............... | G01S 13/91 342/368 |
| 2017/0315228 A1* | 11/2017 | Rhead ................... | G01S 7/4026 |
| 2020/0393539 A1* | 12/2020 | Park ..................... | G01S 7/4021 |

* cited by examiner

*Primary Examiner* — Donald H B Braswell
(74) *Attorney, Agent, or Firm* — Christensen O'Connor Johnson Kindness PLLC

(57) ABSTRACT

A method for determining the three-dimensional alignment of components of a radar system is described. The radar system is provided that comprises at least one portion which is permeable by radar signals. The radar system is imaged by using millimeter waves emitted by an imaging system. In the image obtained, it is determined the highest magnitude reflection coinciding with at least one of an expected location and an expected distance of the surface of a first component of the radar system being of interest. At least one of the position and the distance of that surface is determined. From the measurement, the relative phase information received from each portion of that surface at the determined position and/or the determined distance is obtained. Processing the phase information obtained so as to obtain the azimuth and tilt of the surface. Further, a testing system is described.

15 Claims, 2 Drawing Sheets

METHOD AS WELL AS SYSTEM FOR DETERMINING THE THREE-DIMENSIONAL ALIGNMENT OF COMPONENTS OF A RADAR SYSTEM

CROSS-REFERENCE TO RELATED APPLICATION

This application claims the benefit of U.S. Provisional Application No. 62/763,131, filed on Aug. 7, 2018, the disclosure of which is incorporated by reference herein.

FIELD OF THE DISCLOSURE

Embodiments of the present disclosure relate generally to a method for determining the three-dimensional alignment of components of a radar system. Further, embodiments of the present disclosure relate generally to a testing system for determining the three-dimensional alignment of components in a radar system.

BACKGROUND

In modern cars, radar systems are used for observing other road users or obstacles in front of the car equipped with the radar system. Typically, the radar systems used in vehicles, also called vehicle radar systems, comprise a vehicle radar unit, a radome and/or a bumper. The vehicle radar unit is configured to emit radar signals as well as to receive reflected radar signals. Typically, the vehicle radar unit is placed behind the bumper and/or the radome wherein the respective bumper and/or radome comprise(s) portion(s) being permeable for radar signals so that the radar signals exchanged are not significantly attenuated by the bumper and/or the radome. As the vehicle radar unit is placed behind the bumper or the radome, a mechanical misalignment may occur that impairs the overall performance of the radar system. In some embodiments, the radar signal footprint may be limited due to the mechanical misalignment.

So far, optical systems are used to test and evaluate a possible misalignment of the different components of the vehicle radar system in the production line. However, the optical systems require that the cover covering the vehicle radar unit, namely the bumper and/or the radome, is removed so as to have direct access to the vehicle radar unit, in some embodiments its surface, so as to determine the location of the vehicle radar unit.

Hence, the known methods for determining a mechanical misalignment are very time-consuming in a production environment and, therefore, testing the radar system is expensive. Even though the accuracy achieved by such a testing system is sufficient, it could be improved.

Accordingly, there is a need for determining the three-dimensional alignment of components of a radar system, for example a vehicle radar system, in a more cost-efficient as well as faster manner while having at least the same accuracy.

SUMMARY

The present disclosure provides methods for determining the three-dimensional alignment of components of a radar system. In an embodiment, a method is provided that includes the following steps:

providing the radar system that comprises at least one portion which is permeable by radar signals;

imaging the radar system using millimeter waves emitted by an imaging system;

locating in the image obtained the highest magnitude reflection coinciding with at least one of an expected location and an expected distance of the surface of a first component of the radar system being of interest;

determining at least one of the position and the distance of that surface;

obtaining from the measurement the relative phase information received from each portion of that surface at at least one of the determined position and the determined distance; and processing the phase information obtained so as to determine the azimuth and tilt of the surface.

Further, the present disclosure provides testing systems for determining the three-dimensional alignment of components of a radar system. In an embodiment, a system is provided that comprises:

a radar system for being tested;

an imaging system for emitting millimeter waves for sensing the radar system; and a control and evaluation system connected to the imaging system, the control and evaluation system being configured to locate in the image obtained by the imaging system the highest magnitude reflection coinciding with at least one of the expected location and the expected distance of the surface of a first component of the radar system;

the control and evaluation system being configured to determine at least one of the position and the distance of that surface; and the control and evaluation system being further configured to obtain from the measurement the relative phase information received from each portion of that surface at the determined location.

Accordingly, the present disclosure provides a contactless, three-dimensional examination of position and/or orientation of the radar system, for example its components, while using mmWave technology that has a higher accuracy compared to optical systems used so far. In some embodiments, precise determination of the position and/or the orientation of the radar system, namely its components, is ensured without the need to remove any cover parts covering the radar system, for example the internal components of the radar system. Therefore, the methods as well as the testing systems may be applied for testing vehicle radar systems having radomes and/or bumpers covering the vehicle radar unit.

In some embodiments, the method as well as the testing system mentioned allow precise mapping of a radar signal footprint of the radar system.

The radar system has at least one portion which is permeable by radar signals which means that the radar signals emitted by the radar system may propagate through a component of the radar system having the at least one portion being permeable for radar signals. For instance, in a vehicle radar system, the radome and/or the bumper may be such a component having the at least one permeable portion for the radar signals so as to not attenuate the radar signals emitted and received by the radar system.

The imaging system using millimeter waves may be a mmWave imaging system that emits signals with a wave length in the area of millimeters, namely millimeter waves. The same imaging system may be used for receiving the reflected signals from the radar system so as to obtain the image of the radar system which is used for further evaluation.

Accordingly, the highest magnitude reflection corresponds to the magnitude of the reflected millimeter waves originally emitted by the imaging system at a respective distance and/or location which may be set previously by the expected location and/or the expected distance.

In some embodiments, the position and/or the distance of that surface which has been determined may correspond to the distance from a reference point, for instance the imaging system and/or a separate reference plane.

Thus, the relative phase information is obtained from the measurement which means that the results of the imaging done by the imaging system are processed appropriately so as to obtain information with regard to the relative phase of the millimeter waves used for imaging. The respective relative phase information is received from each portion of that surface at the determined position and/or the determined distance.

In summary, at least one of the position and the orientation of at least one component of the system is determined by the method and the testing system so that this information can be used for detecting a possible misalignment of the components of the radar system. In some embodiments, misalignment of an internal component of the radar system may be detected due to the usage of millimeter waves that may travel through parts covering the radar system or being part of the radar system. Thus, it is not necessary to remove those cover parts for investigating a possible misalignment. Generally, the cover parts may relate to external parts covering the radar system or parts located at the exterior of the radar system.

The phase information obtained may be processed by the steps of performing a transform on the phase information obtained, and computing from that transform the maximum that provides the azimuth and tilt of the surface. The transform used may be, a Fourier transform, for example a Fast Fourier Transform (FFT), or a linear transformation in general.

According to an aspect, the radar system is a vehicle radar system with a vehicle radar unit having a vehicle radar unit surface, a radome having a radome surface, and a bumper having a bumper surface. All these components of the radar system as well as their respective surfaces may be investigated by the method and the testing system appropriately so that the distance and/or the position of the respective surface of the components may be determined. Once the distance and/or the position (orientation) of the respective surfaces are/is determined, the distance and/or the position (orientation) of the components may be determined. Therefore, a mechanical misalignment of the components can be detected.

According to another aspect, a reference plane of perfect alignment is provided, the phase information being compared with phase information relating to the reference plane so as to determine a relative tilt of the surface. The reference plane may be provided by a reference plate such as a flat plate. The reference plane or rather the reference plate providing the reference plane may be located at a reference orientation, for instance at 0 degree azimuth. The relative tilt of the surface may relate to a relative tilt of the surface of a component of the radar system, for instance the vehicle radar unit surface, the radome surface and/or the bumper surface.

In some embodiments, a reference plate providing the reference plane may be included in the imaging volume assigned to the imaging system at a reference orientation, for instance 0 degree azimuth, so that the absolute direction of the radar system, for instance the (vehicle) radar unit, may be determined for comparing the orientation results of both surfaces, namely the surface of the reference plate as well as the surface of the radar unit. In general, the surfaces which are compared may relate to the surface of the reference plate as well as the surface of any component of the radar system being of interest.

The radar unit corresponds to the component of the radar system that is configured to emit radar signals and/or to receive (reflected) radar signals.

Moreover, the azimuth and the tilt of the surface are computed on at least one of a vehicle radar unit surface, a radome surface, a bumper surface or a reference plane. Thus, the respective orientation may be determined for any component of the radar system depending on the expected location and/or expected distance. In some embodiments, the expected location and the expected distance provide an indication which component of the radar system shall be investigated since the overall structure of the radar system will be maintained which means that the position of the components is known at least roughly. In some embodiments, it is known that the radome and/or the bumper will always be located closer to the exterior of the radar system than the radar unit itself since the bumper and/or the radome cover(s) the radar unit.

Another aspect provides that a known three-dimensional structure of the radar system is superimposed with at least one of the determined position and the determined orientation of at least one component of the system so as to determine an intersection area of the radar signals on the at least one component of the radar system. Thus, the footprint of the radar signals on the at least one component of the system may be determined so that this information may be used for calibration purposes since any limitation of the footprint due to a mechanical misalignment of the components may be compensated appropriately.

For instance, an image registration process, for instance an image registration algorithm, is used to localize the lateral position (and orientation) of at least two components, namely radar unit as well as the radome and/or the bumper, after the position and/or the orientation of their respective surfaces have been determined three-dimensionally.

After the respective positions (and orientations) have been determined, the known three-dimensional structure of the radar system is superimposed or rather overlaid on the available results so as to calculate the radar beam intersection with the other components, namely the radome and/or the bumper. The radar beam intersection corresponds to the intersection area.

In some embodiments, the intersection area determined is compared with an intersection area of a properly aligned radar system. Thus, the radar beam intersection (intersection area determined) is compared to the required position in order to determine any deviations which may be compensated by a calibration process which will take place later.

According to an aspect, the at least one component of the radar system corresponds to at least one of the radome and the bumper. Typically, the radome and/or the bumper are located at the exterior of the radar system so that they cover and protect the (vehicle) radar unit configured to emit and/or receive (reflected) radar signals. Thus, the (vehicle) radar unit corresponds to an internal component of the radar system.

Furthermore, information with regard to radar beam properties of the radar system may be provided that is processed together with the azimuth and tilt of the surface determined in order to predict a radar beam cross section of the radar system due to its relative position. Thus, the radar beam cross section through the radome and/or bumper, particularly their respective surface(s), can be predicted while taking the relative orientation/position of the radar system with respect to the radome and/or bumper into account. In other words, information on the radar beam cross section through the component of the radar system, namely the radome and/or the bumper, can be provided by the method, as the relative position/orientation of the radar system is determined, particularly the azimuth and tilt. This information obtained is processed together with information concerning the radar beam properties, namely a beam description of the radar system, known a priori. For instance, the radar beam properties or rather the beam description of the radar system may be known from a datasheet or a computer-aided design file (CAD file) providing information with regard to the radar beam properties of the radar system. Accordingly, the position/orientation of the radar system determined is overlaid with the available information of the radar beam properties in order to predict the actual crossing of the beam through the component of the radar system, for instance the radome and/or bumper. Thus, the actual radar beam cross section can be predicted that might occur even though the radar system is misaligned with respect to the intended position.

The actual radar beam cross section may be used for correcting purposes during operation of the radar system. In other words, deviations of the actual radar beam cross section from the intended one (due to a possible misalignment) are determined and stored. These deviations may be accessed and processed in real applications for compensating measurements.

Another aspect provides that at least one of the expected location and the expected distance is inputted by a user. Therefore, the user may determine which component of the radar system shall be investigated by the method and/or the testing system while inputting a certain location and/or distance as the expected location and/or the expected distance of the component. As already mentioned, the overall structure of the radar system is known so that the relative positions of the components are known. Hence, the positions and/or orientations of the several components are roughly known.

Further, the highest magnitude reflection may be found within a tolerance of at least one of the expected location and the expected distance. Thus, certain deviations can be neglected by the method and the testing system which means that it is searched for the highest magnitude reflection in an (three-dimensional) area around the expected location and/or the expected distance.

As already mentioned, the information obtained may be used for calibration of the radar system. The position and/or the orientation of the radar system, for example its components, may be used for determining the footprint of the (vehicle) radar unit, namely the radar beam provided by the (vehicle) radar unit interacting with the other components. Accordingly, limitations of the area covered by the radar beam may be determined which information can be used for calibration purposes of the radar system.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

DETAILED DESCRIPTION

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

Figure 1:
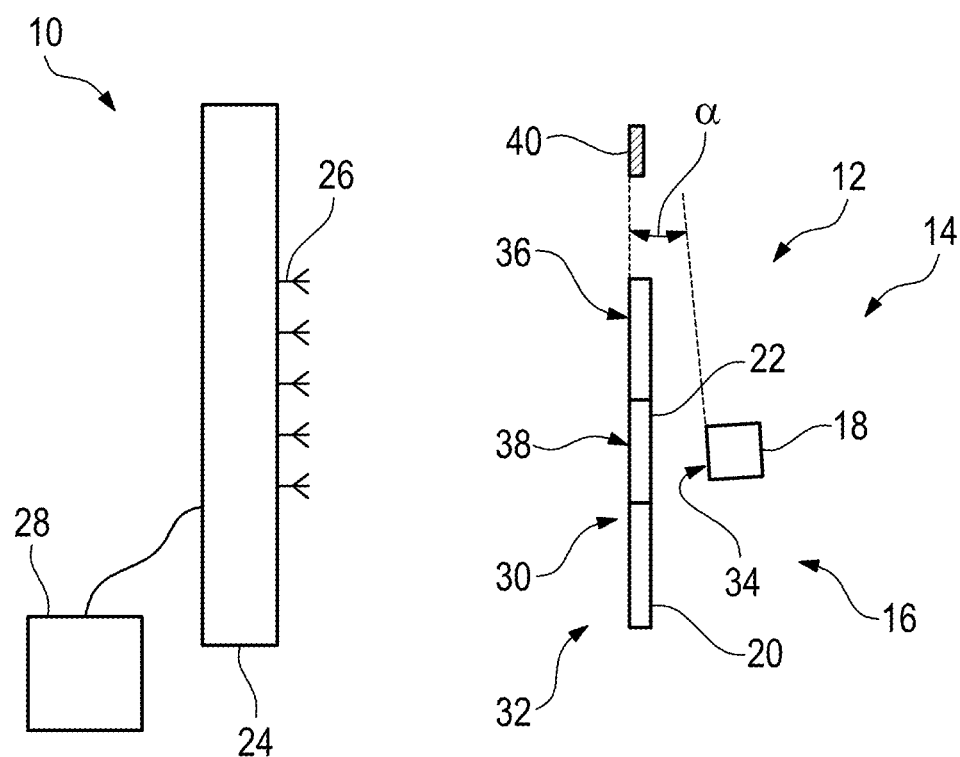
FIG. 1 schematically shows a top view on a testing system according to the present disclosure.

In FIG. 1, a testing system 10 for determining the three-dimensional alignment of components 12 of a radar system 14 is shown. In the shown embodiment, the radar system 14 corresponds to a vehicle radar system 16 that comprises a vehicle radar unit 18, a bumper 20 as well as a radome 22.

In general, the (vehicle) radar unit 18 corresponds to that component 12 of the radar system 14 which is configured to emit radar signals and/or to receive (reflected) radar signals.

The testing system 10 further comprises an imaging system 24 having at least one antenna 26 that is facing the radar system 14 to be tested. In the shown embodiment, the imaging system 24 comprises several antennas 26, for example an antenna array. For instance, the imaging system 24 is a mmWave imaging system that emits signal with a wave length in the area of millimeters, namely millimeter waves.

The testing system 10 also comprises a control and evaluation system 28 that is connected with the imaging system 24 so as to retrieve data obtained by the imaging system 24 wherein the control and evaluation system 28 is configured to process and evaluate the data obtained from the imaging system 24. In some embodiments, the control and evaluation system 28 is implemented in hardware or in software or with a combination of hardware and software. In an embodiment, the control and evaluation system 28 includes combinations of circuits, microprocessors, etc., and computer program products having software or firmware instructions stored on one or more computer readable memories that work together to cause a device to perform the methodologies or technologies described herein.

The radar system 14, namely the vehicle radar system 16, comprises at least one portion 30 that is permeable by radar signals. For instance, this portion 30 is assigned to the radome 22 and/or the bumper 20. In general, the at least one portion 30 that is permeable for radar signals is assigned to an outer component of the radar system 14 which may cover the (vehicle) radar unit 18.

Each of the components 12 of the radar system 14 has a component surface 32 that faces the imaging system 24, for example its antenna(s) 26. In some embodiments, the radar unit 18 has a radar unit surface 34, the bumper 20 has a bumper surface 36 and the radome 22 has a radome surface 38.

Figure 4:
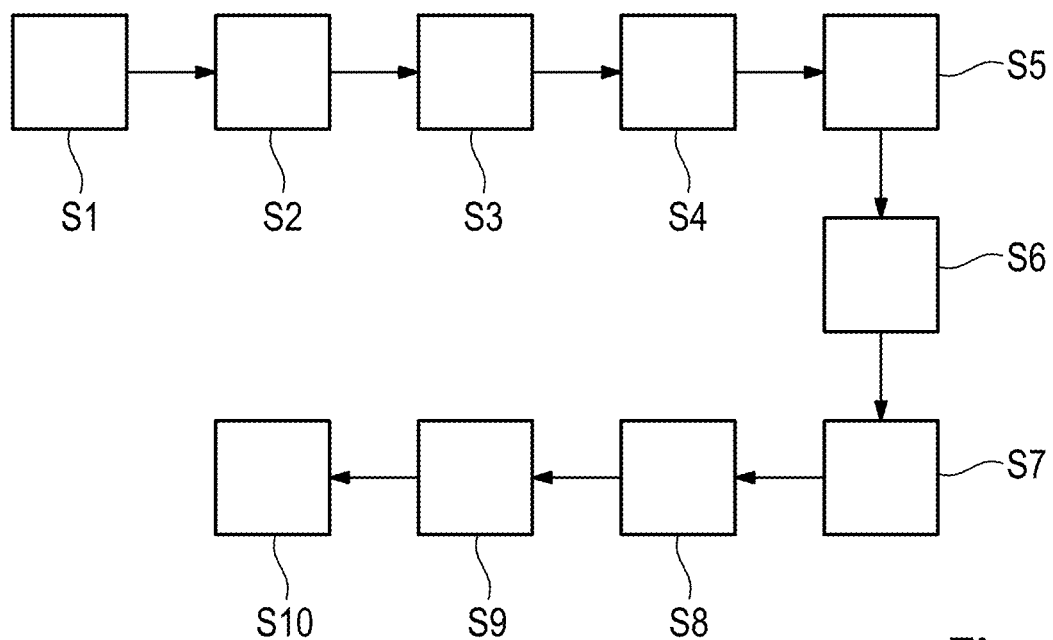
FIG. 4 schematically shows a flow-chart illustrating a method according to the present disclosure.

Moreover, the imaging system 10 according to the embodiment shown also comprises a reference plate 40 which, however, is optional. The reference plate 40 provides a reference plane as will be described hereinafter with respect to FIG. 4 illustrating the method for determining the three-dimensional alignment of the components 12 of the radar system 14.

In the shown embodiment, the radar unit surface 34 has a misalignment with regard to the bumper surface 36 and/or the radome surface 38 of α=5°.

The respective method for determining the three-dimensional alignment of the components 12 of the radar system 14 is described hereinafter with reference to FIG. 4.

In a first step S1, the radar system 14 is provided that comprises the components 12 as described above. In some embodiments, the radar system 14 comprises at least one portion 30 that is permeable for radar signals. The radar system 14 is placed in front of the imaging system 24 so that the respective component surfaces 32, namely the radar unit surface 34, the bumper surface 36 and the radome surface 38 face the active area of the imaging system 24.

The at least one antenna 26 is assigned to the active area of the imaging system 24. In some embodiments, the at least one antenna 26 is arranged in this active area.

In a second step S2, an image of the radar system 14 is taken by using millimeter waves which are emitted by the imaging system 24. The respective waves are emitted by the imaging system 24 wherein the respective waves are reflected by the radar system 14. The imaging system 24 receives the reflected waves wherein the information regarding the reflected waves is forwarded to the control and evaluation system 28 for further processing.

Figure 2:
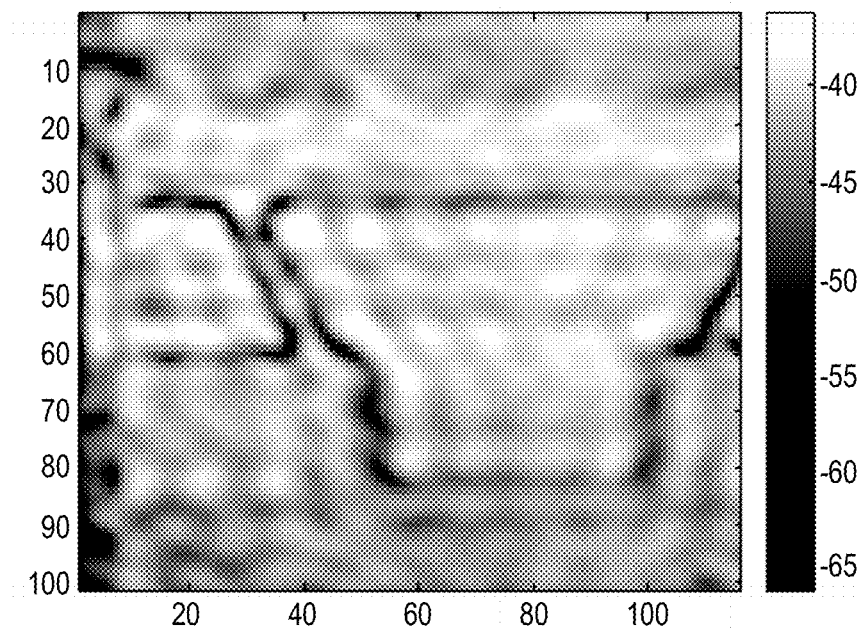
FIG. 2 schematically shows an image taken by the imaging system after processing by the control and evaluation system of the testing system of FIG. 1.

Such an image provided by the imaging system 24 is shown in FIG. 2 wherein the different reflection magnitudes of the millimeter waves reflected from the radar system 14 and received by the imaging system 24 are shown in a certain plane after evaluation by the control and evaluation system 28.

In a third step S3, the system 10, for example the control and evaluation system 28, locates the highest magnitude reflection coinciding with an expected location and/or an expected distance of the component surface 32, namely the surface of at least one component 12 of the radar system 14 wherein the respective component 12 is of interest.

The respective expected location and/or expected distance may be inputted by the user of the system 10 so as to define a plane for the imaging system at which plane an image shall be taken of the radar system 14, for example the respective component(s) 12. Thus, the user can decide which component 12 of the radar system 14 shall be investigated.

In a fourth step S4, at least one of the position or the distance of that component surface 32 is determined. This can be done by the control and evaluation system 28.

For determining the at least one of the position or the distance of that component surface 32, the reference plate 40 may be used which provides a reference plane so that a reference point is provided for the testing system 10, namely the imaging system 24 and/or the control and evaluation system 28.

Alternatively, the position of the imaging system 24 or any other reference point can be used, for instance a testing location on which the radar system 14 is placed.

In a fifth step S5, the relative phase information is obtained from the measurement(s) wherein the relative phase information is received from each portion of that surface 32 at the determined position and/or the determined distance.

In a sixth step S6, a transform on the phase information obtained is performed, for instance a Fourier transform. Hence, the data obtained by the imaging system 24 is transformed into a transform domain for further processing.

Figure 3:
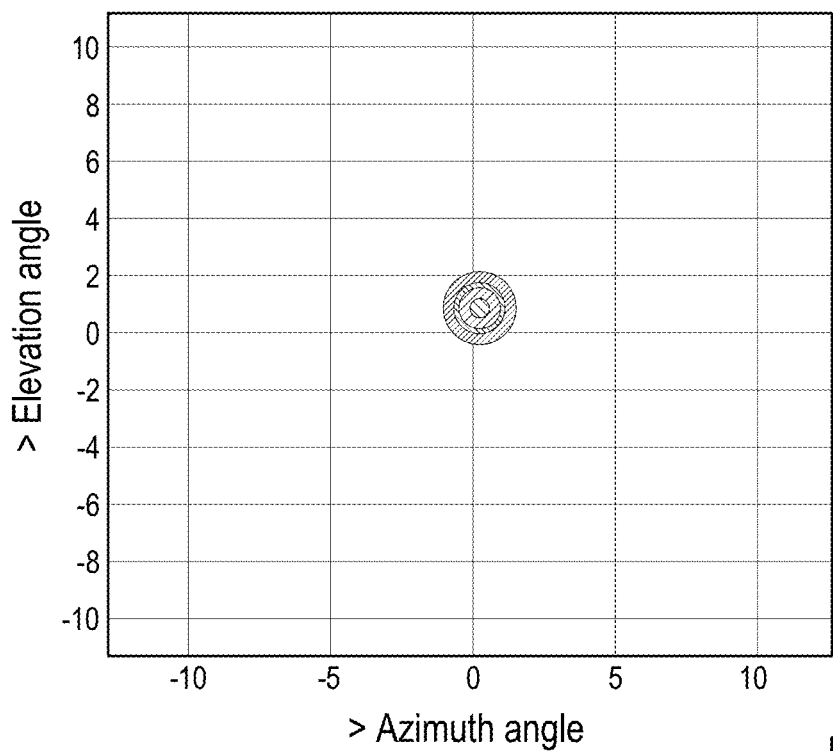
FIG. 3 schematically shows an overview representing the data obtained after performing a transform on the phase information of the measurements obtained.

In a seventh step S7, the maximum is computed from the transform, namely the data in the transform domain, wherein the maximum computed provides the azimuth and tilt of the surface 32 as illustrated in FIG. 3.

Therefore, steps S6 and S7 relate to the general step of processing the phase information obtained so as to determine the azimuth and tilt of the surface 32. Thus, the azimuth angle as well as the tilt or rather the evaluation angle may be determined appropriately.

In some embodiments, the position as well as the orientation of the at least one component 12 of the radar system 14 is determined depending on the expected location and/or the expected distance chosen.

As already discussed above, the reference plate 40 provides a reference plane of perfect alignment as the reference plate 40 may be located at a reference orientation, for instance 0 degree azimuth. Thus, the phase information obtained from the surface 32 of the component 12 may be compared with the phase information obtained from the reference plate 40 so as to determine a relative tilt of the surface 32 of the component 12 with respect to the perfectly aligned reference plate 40.

In general, the orientation, namely the azimuth angle, the evaluation angle and/or the tilt of the surface 32 of any component 12 of the radar system 14 may be determined or rather computed from the data obtained.

For instance, the component 12 of interest may relate to the vehicle radar unit 18, the radome 22 and/or the bumper 20 so that the azimuth angle, the evaluation angle and/or the tilt of the respective surface 32 is determined, namely the one of the radar unit surface 34, the bumper surface 36 and/or the radome surface 38.

Once the three-dimensional position and/or orientation of the surfaces 32, 34, 36, 38 are determined, the respective lateral position of the respective components 12 may be determined appropriately (Step S8) wherein afterwards a three-dimensional structure such as a CAD-model of the radar system 14 is superimposed or rather overlaid with the results obtained previously (Step S9).

Therefore, a radar beam intersection, namely an intersection area of the radar signals emitted by the radar unit 18, with at least one component 12 of the radar system 14 may be calculated. The respective component 12 may be the bumper 20 and/or the radome 22.

The respective intersection area determined may be compared with an ideal intersection area which corresponds to an intersection area of a properly aligned radar system, for instance the one of a model applied, so that the intersection determined from the measurement results is compared to a required position or rather an intended position of the radar system 14 so as to determine any deviations from the ideal alignment.

This information may be used for calibrating the radar system 14 (Step S10) so that the respective footprint of the radar system 14 is determined which can be used later for calibration purposes.

In some embodiments, a precise mapping of the radar signal footprint of the radar system 14 is obtained by the method using the testing system 10. Therefore, the beam direction of the radar system 14 can be calibrated or rather adjusted with a higher accuracy than it is done so far.

Further, the radar system 14 may be investigated in a more cost-efficient manner since the testing time is reduced as no cover parts have to be removed prior to the testing of the radar system 14.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The embodiments of the invention in which an exclusive property or privilege is claimed are defined as follows:

1. A method for determining the three-dimensional alignment of components of a radar system, with the following steps:
    providing the radar system that comprises at least one portion which is permeable by radar signals;
    imaging the radar system using millimeter waves emitted by an imaging system;
    locating in the image obtained the highest magnitude reflection coinciding with an expected location and/or an expected distance of the surface of a first component of the radar system being of interest;
    determining the position and/or the distance of that surface;
    obtaining from the measurement the relative phase information received from each portion of that surface at the determined position and/or the determined distance; and
    processing the phase information obtained so as to determine the azimuth and tilt of the surface, wherein the phase information obtained is processed by the steps of performing a transform on the phase information obtained, and computing from that transform the azimuth and tilt of the surface.

2. The method according to claim 1, wherein the radar system is a vehicle radar system with a vehicle radar unit having a vehicle radar unit surface, a radome having a radome surface, and a bumper having a bumper surface.

3. The method according to claim 1, wherein a reference plane of perfect alignment is provided, the phase information being compared with phase information relating to the reference plane so as to determine a relative tilt of the surface.

4. The method according to claim 1, wherein the azimuth and the tilt of the surface are computed on a vehicle radar unit surface, a radome surface, a bumper surface and/or a reference plane.

5. The method according to claim 1, wherein a known three-dimensional structure of the radar system is superimposed with the determined position and/or the determined orientation of at least one component of the system so as to determine an intersection area of the radar signals on the at least one component of the radar system.

6. The method according to claim 5, wherein the intersection area determined is compared with an intersection area of a properly aligned radar system.

7. The method according to claim 5, wherein the at least one component of the radar system corresponds to a radome and/or a bumper.

8. The method according to claim 1, wherein information with regard to radar beam properties of the radar system is provided that is processed together with the azimuth and tilt of the surface determined in order to predict a radar beam cross section of the radar system due to its relative position.

9. The method according to claim 1, wherein the expected location and/or the expected distance is inputted by a user.

10. The method according to claim 1, wherein the highest magnitude reflection is found within a tolerance of the expected location and/or the expected distance.

11. The method according to claim 1, wherein the information obtained is used for calibration of the radar system.

12. The method according to claim 1, wherein the transform used is a Fourier transform.

13. A testing system for determining the three-dimensional alignment of components of a radar system, comprising:
    a radar system for being tested;
    an imaging system configured to emit millimeter waves for sensing the radar system; and
    a control and evaluation system connected to the imaging system,
    the control and evaluation system being configured to locate in the image obtained by the imaging system the highest magnitude reflection coinciding with the expected location and/or the expected distance of the surface of a first component of the radar system;
    the control and evaluation system being configured to determine the position and/or the distance of that surface; and
    the control and evaluation system being further configured to obtain from the measurement the relative phase information received from each portion of that surface at the determined location, wherein a transform is performed on the phase information obtained, the azimuth and tilt of the surface being computed from that transform.

14. The testing system according to claim 13, wherein the imaging system is a mmWave imaging system emitting signals with a wavelength in the area of millimeter.

15. A method for determining the three-dimensional alignment of components of a radar system, with the following steps:
    providing the radar system that comprises a vehicle radar unit having a vehicle radar unit surface, wherein the radar system also comprises a radome having a radome surface and/or a bumper having a bumper surface, which is permeable by radar signals;
    imaging the radar system using millimeter waves emitted by an imaging system;
    locating in the image obtained the highest magnitude reflection coinciding with an expected location and/or an expected distance of the surface of a first component of the radar system being of interest;
    determining the position and/or the distance of that surface;
    obtaining from the measurement the relative phase information received from each portion of that surface at the determined position and/or the determined distance; and
    processing the phase information obtained so as to determine the azimuth and tilt of the surface, wherein the phase information obtained is processed by the steps of performing a transform on the phase information obtained, and computing from that transform the maximum that provides the azimuth and tilt of the surface.

* * * * *